United States Patent [19]

Kawamura

[11] Patent Number: 5,069,178

[45] Date of Patent: Dec. 3, 1991

[54] ENGINE WITH VARIABLE COMBUSTION CHAMBER

[75] Inventor: Hideo Kawamura, Samukawa, Japan

[73] Assignee: Isuzu Motors Limited, Tokyo, Japan

[21] Appl. No.: 589,545

[22] Filed: Sep. 28, 1990

[30] Foreign Application Priority Data

Sep. 30, 1989 [JP] Japan .................. 1-256418

[51] Int. Cl.⁵ .......................................... F02B 19/00
[52] U.S. Cl. .................. 123/256; 123/292; 123/276
[58] Field of Search ............. 123/256, 292, 276, 259, 123/304, 1 A, 261

[56] References Cited

U.S. PATENT DOCUMENTS

| | | | |
|---|---|---|---|
| 4,160,432 | 7/1979 | Tsutsumi | 123/256 |
| 4,161,927 | 7/1979 | Yagi et al. | 123/256 |
| 4,241,703 | 12/1980 | Lin-Liaw | 123/292 |
| 4,372,264 | 2/1983 | Truao | 123/292 |
| 4,401,072 | 8/1983 | Ito et al. | 123/292 |
| 4,440,124 | 4/1984 | Eckert | 123/261 |
| 4,522,173 | 6/1985 | Agache | 123/276 |
| 4,532,899 | 8/1985 | Lorts | 123/292 |
| 4,726,331 | 2/1988 | Hoppie et al. | 123/276 |
| 4,745,891 | 5/1988 | Cola | 123/256 |
| 4,854,281 | 8/1989 | Marayama et al. | 123/292 |

Primary Examiner—Raymond A. Neill
Attorney, Agent, or Firm—Staas & Halsey

[57] ABSTRACT

An engine with a variable combustion chamber has a a first combustion chamber defined in a piston slidably disposed in a cylinder, a second combustion chamber defined in a cylinder head and communicating with the cylinder through a communication port, and a valve for opening and closing the communication port. When the engine is under low load, the valve is closed and fuel is injected into the first combustion chamber, so that the engine operates as a direct-injection-type engine. When the engine is under high load, the valve is opened and fuel is injected into the second combustion chamber, so that the engine operates as a prechamber-type engine.

7 Claims, 2 Drawing Sheets

ENGINE WITH VARIABLE COMBUSTION CHAMBER

BACKGROUND OF THE INVENTION

1. Field of the Invention

The present invention relates to an engine with a variable combustion chamber which can be modified into a direct-injection-type combustion chamber when the engine operates under low load and a prechamber-type combustion chamber when the engine operates under high load, and more particularly to such an engine which employs alcohol as fuel.

2. Prior Art

Fuel for use in conventional engines is fossil fuel such as gasoline, light oil, or the like. The fossil fuel is a limited natural resource. Exhaust gases emitted from engines which burn gasoline, light oil, etc. contain harmful substances which are partly responsible for the air pollution. Various efforts have been made to eliminate or reduce these shortcomings. Among the various attempts has been an engine which uses, as fuel, alcohol which is chemically or biochemically produced.

Alcohol has a greater latent heat value of vaporization and generates smaller heat than conventional fuels. For example, in order to produce the same amount of heat, it is necessary to supply an engine with alcohol which is about 1.6 times light oil. Since the amount of alcohol injected into an engine cylinder is larger, air and injected alcohol are not easily mixed together in the combustion chamber, and the time required for the alcohol to be diffused and combusted is longer. Especially when the engine is subjected to high load, the amount of alcohol to be injected is increased and hence the engine output power and the combustion efficiency are lowered.

When alcohol is supplied in an amount which is 1.6 times, then its latent heat of vaporization is about 5.6 times that of light oil. Therefore, alcohol less tends to be vaporized in the combustion chamber. When the engine is started or the temperature of ambient air is low, alcohol is not fully burned, and unburned gases are emitted from the engine, with the results that uncomfortable odors are produced and air is polluted by harmful substances contained in the emitted unburned gases. In addition, the injected alcohol may not be ignited, and the engine may not be started.

Various engines with variable compression ratios have been proposed in order to improve the ability to start at low temperatures. For example, Japanese Utility Model Publication No. 57(1982)-164224 discloses an engine having a main combustion chamber and an auxiliary chamber communicating therewith. In addition to intake and exhaust valves, a third valve is disposed in the opening of the auxiliary chamber. When the engine is under low load, the opening of the auxiliary chamber is closed by the third valve, giving the engine a higher compression ratio. When the engine is under high load, the third valve is opened on each compression stroke, thus reducing the compression ratio for the prevention of knocking. However, the disclosed engine cannot solve the problems referred to above.

SUMMARY OF THE INVENTION

It is an object of the present invention to provide an engine with a variable combustion chamber, which engine can be started well even if it uses alcohol fuel, and prevents combustion efficiency from being lowered when the engine operates under high load.

According to the present invention, there is provide an engine comprising a cylinder, a piston slidably disposed in the cylinder, a first combustion chamber defined in the piston, a cylinder head mounted on the cylinder, a second combustion chamber defined in the cylinder head and communicating with the cylinder through a communication port, a valve mounted in the cylinder head for opening and closing the communication port, intake and exhaust passages communicating with the cylinder, a first fuel injection nozzle for injecting fuel into the first combustion chamber, a second fuel injection nozzle for injection fuel into the second combustion chamber, fuel supply means for supplying fuel to one of the first and second fuel injection nozzles at a time, valve actuating means for actuating the valve to open and close the communication port, load detecting means for detecting a load on the engine, and control means for operating the valve actuating means to open the valve and controlling the fuel supply means to supply fuel to the second fuel injection nozzle when the load on the engine as detected by the load detecting means is equal to or higher than a predetermined value, and for operating the valve actuating means to close the valve and controlling the fuel supply means to supply fuel to the first fuel injection nozzle when the load on the engine as detected by the load detecting means is lower than the predetermined value.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
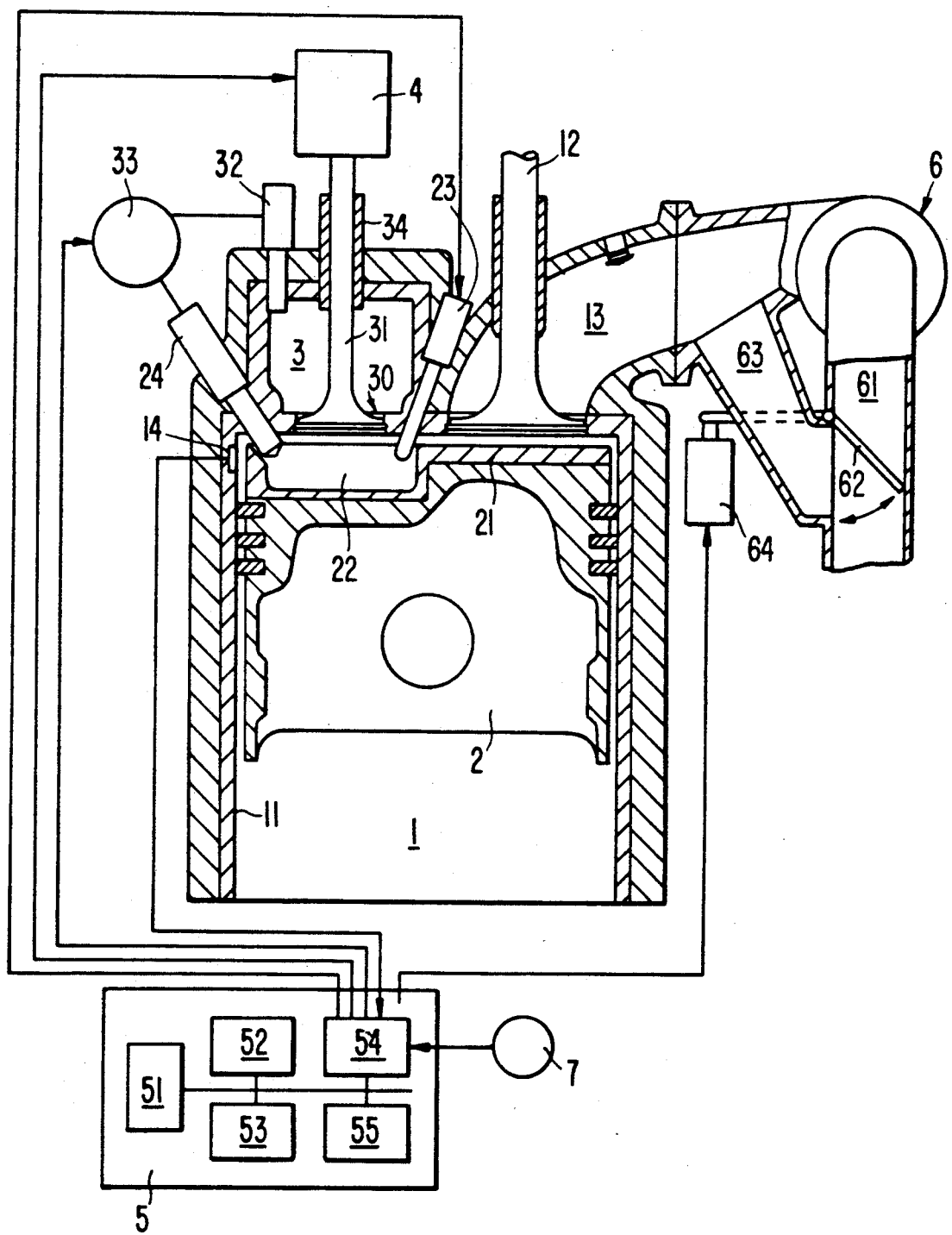
FIG. 1 is a schematic cross-sectional view, partly in block form, of an engine with a variable combustion chamber according to the present invention.

FIG. 1 shows, partly in block form, an engine with a variable combustion chamber according to the present invention.

The engine has a cylinder 1 whose inner wall surface is lined with a cylinder sleeve 11 that is made of a heat insulating ceramic material such as silicon nitride, zirconia, or the like. The cylinder sleeve 11 has in its upper portion a pressure sensor 14 for measuring the pressure in the cylinder 1. A cylinder head mounted on the cylinder 1 has an intake passage 13 defined therein which is selectively openable and closable by an intake valve 12. Although not shown, the cylinder head also has an exhaust passage defined therein which is selectively openable and closable by an exhaust valve.

A piston 2 is slidably disposed in the cylinder 1. The piston 2 has a piston head covered with a heat insulating layer 21 which is made of the same heat insulating ceramic material as the material of the cylinder sleeve 11. The piston head of the piston 2 has a recess defined therein as a first combustion chamber 22. The cylinder head supports a glow plug 23 which can be positioned in the first combustion chamber 22 when the piston 2 reaches the top dead center and a first nozzle 24 for injecting fuel such as alcohol fuel into the first combustion chamber 22 when the the piston 2 reaches the top dead center.

The cylinder head has a second combustion chamber 3 defined therein and communicating with the cylinder 1 through a communication port 30. The communication port 30 is openable and closable by a valve 31 disposed therein, the valve 31 being axially slidably supported in the cylinder head by a valve guide 34. The cylinder head supports a second nozzle 32 for injecting fuel such as alcohol fuel into the second combustion chamber 3. The first nozzle 24 and the second nozzle 32 are connected to a fuel pump 33 so that they are supplied with fuel such as alcohol fuel. The fuel pump 33 can start and stop the supply of fuel to the first nozzle 24 and the second nozzle 32 at timings which can be freely varied by signals applied to the fuel pump 33. The second combustion chamber 3 has an inner wall made of the same heat insulating ceramic material as the material of the cylinder sleeve 11. The valve 31 and the valve guide 34 are made of a high-strength heat insulating ceramic material.

A valve opening and closing mechanism 4 is coupled to the shank end of the valve 31. The valve opening and closing mechanism 4 comprises an electromagnetic solenoid which electromagnetically attracts a magnetic member joined to the shank end of the valve 31. The valve 31 is normally lifted upwardly in FIG. 1, closing the communication port 30. When the valve 31 is driven downwardly by the valve opening and closing mechanism 4, the valve 31 opens the communication port 30.

The pressure sensor 14, the glow plug 23, the fuel pump 33, and the valve opening and closing mechanism 4 are electrically connected to an input/output interface 54 of a control unit 5. The control unit 5 comprises, in addition to the input/output interface 54, a ROM 52 for storing a program and relevant data, a CPU 51 for carrying out calculations under the control of the program stored in the ROM 52, a RAM 53 for temporarily storing the results of the calculations and data, and a control memory 55 for controlling the flow of signals in the control unit 5.

The intake passage 13 is connected to the outlet port of a compressor of a turbocharger 6. The compressor of the turbocharger 6 has an inlet port connected to an intake pipe 61 which is branched into a bypass pipe 63 coupled to the intake passage 13. A selector valve 62 is disposed in the intake pipe 61 where the bypass pipe 63 is branched therefrom. The selector valve 62 is connected to a solenoid actuator 64 which selectively opens and closes the selector valve 62. The solenoid actuator 64 is electrically connected to the input/output interface 54 of the control unit 5, and opens and closes the selector valve 62 in response to a signal from the input/output interface 54. The turbocharger 6 has a rotatable shaft (not shown) on which a rotary electric machine (not shown) is mounted. When intake air is not supplied to the compressor of the turbocharger 6 by the selector valve 62, the rotary electric machine is operated as a generator thereby to convert the energy of exhaust gases emitted from the engine into electric energy, which is to be recovered.

The load on the engine is detected by a load sensor 7 based on the amount of depression of an accelerator pedal (not shown). A load signal detected by the load sensor 7 is applied to the input/output interface 54.

Figure 2:
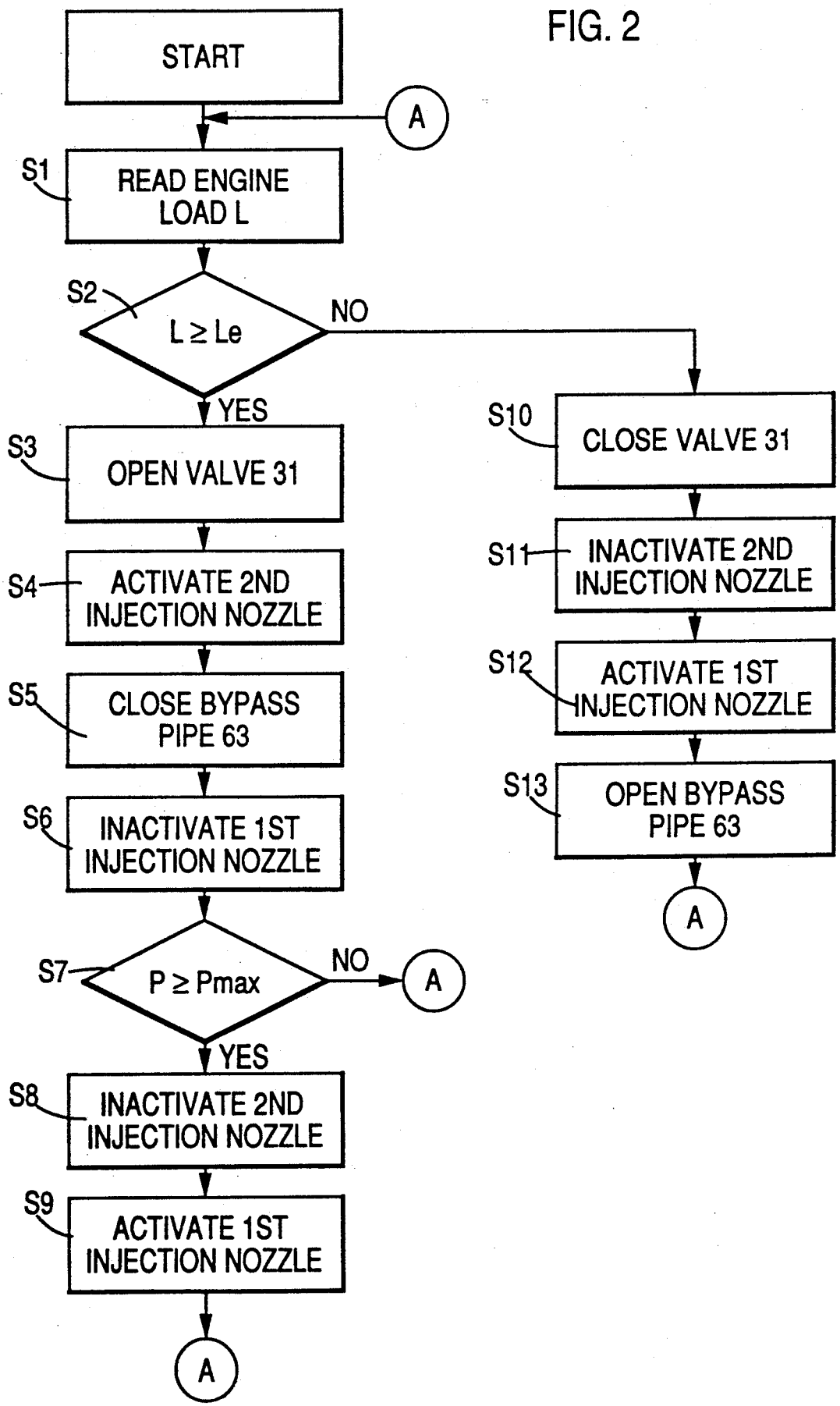
FIG. 2 is a flowchart of an operation sequence of the engine with variable combustion chamber shown in FIG. 1.

Operation of the engine thus constructed will now be described below with reference to FIG. 2.

In a step S1, an engine load signal L from the load sensor 7 is read into the control unit 5 through the input/output interface 54.

The engine load signal L is then compared with a preset load Le stored in the ROM 52 in a step S2. If L≧Le, then control goes to a step S3, and if L<Le, then control goes to a step S10.

If L≧Le, since the engine undergoes high load, the engine is operated as a prechamber-type engine.

More specifically, a signal is transmitted from the control unit 5 to the valve opening and closing mechanism 4 to move the valve 31 downwardly, thus opening the communication port 30.

A signal is sent from the control unit 5 to the fuel pump 33 to control the fuel pump 33 to supply fuel to the second nozzle 32 at a predetermined timing in a step S4. A signal is also sent from the control unit 5 to the solenoid actuator 64 to cause the selector valve 62 to close the bypass pipe 63 in a step S5. Intake air is now introduced into the intake pipe 61 and compressed by the compressor of the turbocharger 6, so that compressed intake air is supplied into the cylinder 1 through the intake passage 13.

In a step S6, a signal is transmitted from the control unit 5 to the fuel pump 33 to stop the supply of fuel to the first nozzle 24.

The steps S3 through S6 operate the engine as a prechamber-type engine.

If the pressure in the cylinder 1 unduly builds up while the engine is operating as a prechamber-type engine under high load, the engine may be broken down. In view of such a danger, control goes from the step S6 to a step S7 to monitor the pressure in the cylinder 1.

In the step S7, a cylinder pressure signal P from the pressure sensor 14 is read into the control unit 5, and compared with a maximum cylinder pressure Pmax stored in the ROM 52. If P≧Pmax, then control proceeds to steps S8, S9. If P<Pmax, then control returns to the step S1 to execute the entire flow cycle again.

In the step S8, a signal is applied from the control unit 5 to the fuel pump 33 to stop the supply of fuel to the second nozzle 32. In the step S9, fuel is supplied to the first nozzle 24 for lower engine load, thereby to lower the pressure in the cylinder 1.

If L<Le in the step S2, since the engine is under low load, control goes to steps S10 through S13 for operating the engine as a direct-injection-type engine with only the first combustion chamber 22 used as a sole combustion chamber.

More specifically, a signal is sent from the control unit 5 to the valve opening and closing mechanism 4 to lift the valve 31 thereby closing the communication port 30 in the step S10.

In the step S11, a signal is applied from the control unit 5 to the fuel pump 33 to stop the supply of fuel to the second nozzle 32.

In the step S12, fuel starts being supplied to the first nozzle 24.

In the step S13, a signal is sent from the control unit 5 to the solenoid actuator 64 to move the selector valve 62 to open the bypass pipe 63. Thereafter, control goes back to the step 1 for the execution of the entire flow cycle again.

The direct-injection-type engine which is operated by the steps S10 through S13 has a compression ratio ranging from 20 to 21 which is higher than the compression ratio of ordinary direct-injection-type engines. Since the temperature in the cylinder at the compression stroke end is higher than the corresponding temperature, about 650° C., of ordinary direct-injection-type engines, the direct-injection-type engine according to the present invention can be well started even if alcohol fuel is used. Since the direct-injection-type engine has a smaller combustion chamber inner wall area, it has a lower cooling loss and hence provides good fuel economy.

With the prechamber-type engine which is operated by the steps S3 through S6, when intake air flows through the communication port 30 into the prechamber or second combustion chamber 3, an intake air swirl is developed in the second combustion chamber 3. Therefore, even when a large amount of fuel is injected from the second nozzle 32 into the second combustion chamber 3, the intake air and the fuel can quickly be mixed together, so that adequate fuel combustion is achieved. When the communication port 30 is opened, the volume of the combined combustion chamber becomes larger by the volume of the second combustion chamber 3. Since, however, the valve 31 is opened and the engine is supercharged by the turbocharger 6, the density of intake air in the combustion chamber is not reduced as compared with the direct-injection-type engine.

Irrespective of whether the engine of the present invention operates as a direct-injection-type engine or a prechamber-type engine, because the inner wall of the combustion chamber is covered with a heat insulating material, exhaust gases emitted from the engine are of high temperature and hence have large energy. The surface of the heat insulating material on the inner wall of the cylinder is prevented from being abnormally heated to high temperature since injected fuel is rapidly vaporized while absorbing latent heat of vaporization from the surface of the heat insulating material.

With the present invention, as described above, when the engine is under low load with the amount of injected fuel being low, the engine operates as a direct-injection-type engine having a high compression ratio. Therefore, the fuel consumption is low, the engine can be well started, and emission of unburned gases is minimized. When the engine is under high load, it operates as a prechamber-type engine. Therefore, alcohol fuel and intake air are rapidly mixed together, and the output power and efficiency of the engine are not lowered.

Although a certain preferred embodiment has been shown and described, it should be understood that many changes and modifications may be made therein without departing from the scope of the appended claims.

What is claimed is:

1. An engine comprising:
   a cylinder;
   a piston slidably disposed in said cylinder;
   a first combustion chamber defined in said piston;
   a cylinder head mounted on said cylinder;
   a second combustion chamber defined in said cylinder head and communicating with said cylinder through a communication port;
   a valve mounted in said cylinder head for opening and closing said communication port;
   intake and exhaust passages communicating with said cylinder;
   a first fuel injection nozzle for injecting fuel into said first combustion chamber;
   a second fuel injection nozzle for injection fuel into said second combustion chamber;
   fuel supply means for supplying fuel to one of said first and second fuel injection nozzles at a time;
   valve actuating means for actuating said valve to open and close said communication port;
   load detecting means for detecting a load on the engine; and
   control means for operating said valve actuating means to open said valve and controlling said fuel supply means to supply fuel to said second fuel injection nozzle when the load on the engine as detected by said load detecting means is equal to or higher than a predetermined value, and for operating said valve actuating means to close said valve and controlling said fuel supply means to supply fuel to said first fuel injection nozzle when the load on the engine as detected by said load detecting means is lower than said predetermined value.

2. An engine according to claim 1, further including a glow plug extending into said first combustion chamber.

3. An engine according to claim 1, wherein at least an inner wall of said second combustion chamber is made of a ceramic material.

4. An engine according to claim 1, wherein an inner wall of said second combustion chamber is made of a ceramic material, and said valve is made of a ceramic material.

5. An engine according to claim 1, wherein respective inner walls of said first and second combustion chambers are made of a ceramic material.

6. An engine according to claim 1, further including supercharging means connected to the intake passage, a bypass passage connected to said intake passage in bypassing relation to said supercharging means, and a selector valve disposed in said intake passage where the bypass passage is connected to the intake passage, said control means comprising means for operating said selector valve to close said bypass passage when the load on the engine as detected by said load detecting means is equal to or higher than said predetermined value, and for operating said selector valve to open said bypass passage when the load on the engine as detected by said load detecting means is lower than said predetermined value.

7. An engine according to claim 1, further including a pressure sensor for detecting a pressure in said cylinder, said control means comprising means for stopping the supply of fuel to said second fuel injection nozzle and supplying fuel to said first fuel injection nozzle when the pressure in the cylinder as detected by said pressure sensor is equal to or higher than a predetermined maximum pressure.

* * * * *